June 11, 1968  I. DAKLI ET AL  3,388,172
WATER-SOLUBLE PARAFORMALDEHYDE COMPOSITIONS
Filed Aug. 25, 1966  2 Sheets-Sheet 1

Solubility of Paraformaldehyde in Deionized Water at 50°C

INVENTORS
IBRAHIM DAKLI
NAZARENO LUPI
VALENTINO ZAMBONI
AVIO D'EMILIO

Solubility of Paraformaldehyde in a Buffer at pH of 5.75 at 50°C

United States Patent Office

3,388,172
Patented June 11, 1968

3,388,172
WATER-SOLUBLE PARAFORMALDEHYDE
COMPOSITIONS
Ibrahim Dakli, Busto Arsizio, Varese, Nazareno Lupi, Castellanza, Varese, Valentino Zamboni, Busto Arsizio, Varese, and Avio D'Emilio, Milan, Italy, assignors to Montecatini Edison S.p.A., Milan, Italy
Continuation-in-part of application Ser. No. 295,304, July 16, 1963. This application Aug. 25, 1966, Ser. No. 584,291
Claims priority, application Italy, July 17, 1962, 14,410/62, Patent 678,670
4 Claims. (Cl. 260—615.5)

ABSTRACT OF THE DISCLOSURE

Paraformaldehyde composition having a formaldehyde content higher than 75%, a dry microcrystalline appearance free of pasty and aldolic products, a water solubility at 50° C. of about 95% in 30–40 minutes, polyoxymethylene chains having an average polymerization degree of between 15 and 70, containing 0.01 to 5% by weight of said composition of a stabilizer having the formula

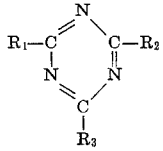

Figure 1:
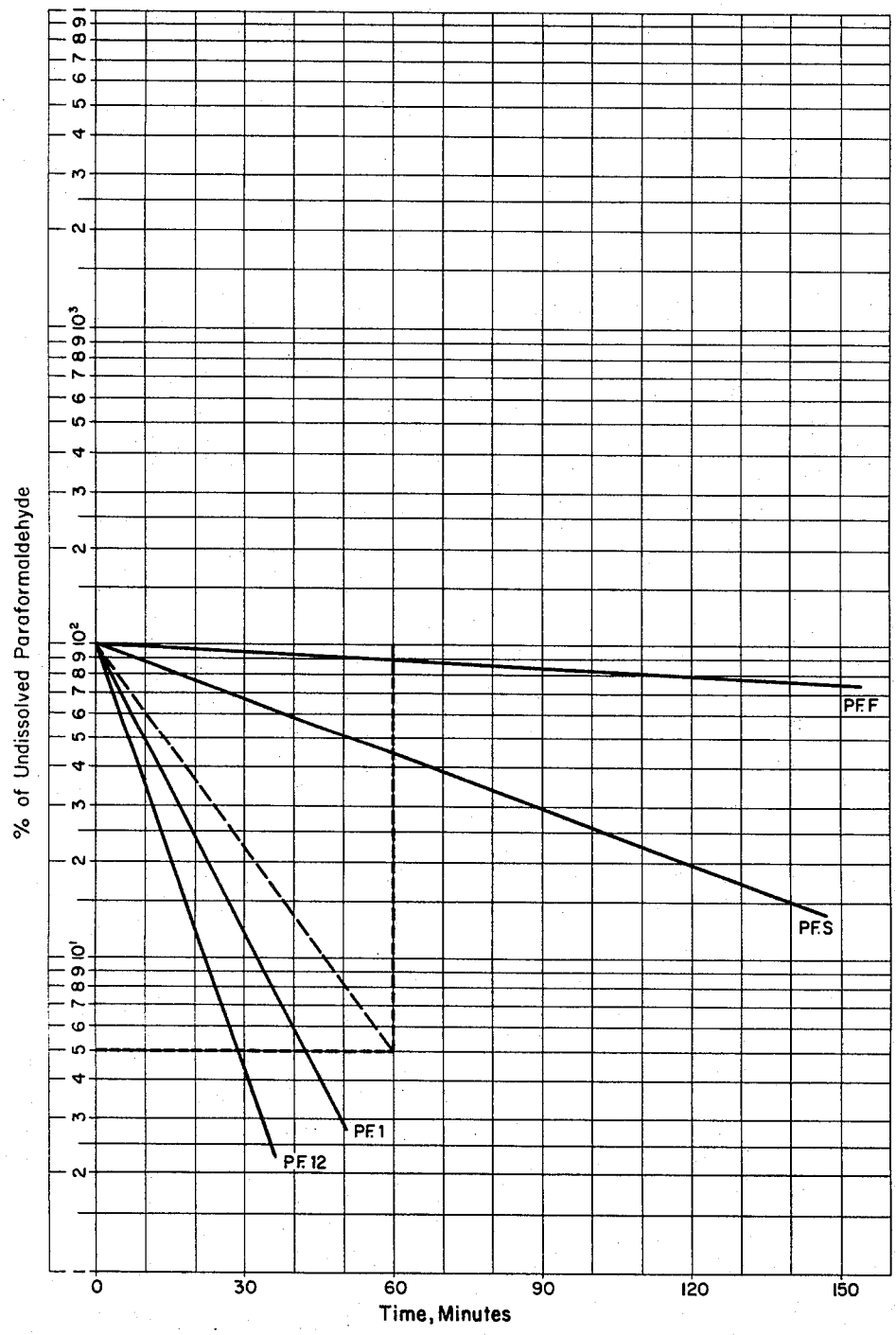

in which $R_1$ is selected from the group consisting of hydrogen, alkyl, aryl, a partially hydrogenated aryl, cycloalkyl, alkylaryl, and alkenylamino radicals and $R_2$ and $R_3$ are each —NR'R" radicals in which R' and R" are each selected from the group consisting of hydrogen, aryl, alkyl and hydroxyalkylene radicals.

---

This application is a continuation-in-part of application Ser. No. 295,304, filed July 16, 1963, and now abandoned.

This invention relates to a particular type of paraformaldehyde which is completely soluble in water; has low molecular weight polyoxymethylene chains and yields, upon dissolution in water, aqueous solutions of formaldehyde which are stable even at low temperatures.

It is known that the polymerization of formaldehyde can be promoted by a convenient modification of the pH value in a sufficiently concentrated aqueous formaldehyde solution kept at a temperature generally lower than 50° C.

The formation of polyoxymethylenes and their precipitation from the solution, as well as the ratio of the amount of formaldehyde precipitated to the initial amount of formaldehyde, are influenced by different operating parameters, such as:

(1) The initial formaldehyde concentration of the aqueous solution;
(2) The pH value;
(3) The crystallization temperature.

It may in fact be observed that:

(1) The higher the initial concentration of the aqueous formaldehyde solution, the higher the conversion of formaldehyde into polymer. There is obviously a limit presented by the difficulty of concentrating the formaldehyde solution above a given concentration.

(2) The polymerization can be obtained either by lowering the pH below 2 or by increasing it above 5.

In practice the pH value is conveniently regulated between 8 and 10. Higher pH values are effective but not useful since they favor a Cannizzaro reaction.

(3) The lower the crystallization temperature the higher the polymer yield. It should however be kept in mind that the polymers formed at a temperature lower than 25° C. comprise a high percentage of a low molecular weight product whose pasty consistency makes it very difficult to centrifuge and to further handle. In order to obtain products having desirable characteristics, the literature reports that it is necessary to operate:

(a) In the presence of high amounts of methanol (Naujoks-Walker: "Formaldehyde" page 127).

(b) At crystallization temperatures between 25 and 40° C. in the presence of a solid phase (polyoxymethylenes) added in the ratio of 0.25 to 0.75 with respect to the formaldehyde of the solution (see French Patent No. 1,253,-275).

(c) By crystallizing at higher temperature (e.g. 60–70° C., see U.S. Patent 2,694,076).

In U.S. patent application Ser. No. 231,034, filed on Oct. 16, 1962, now abandoned in favor of continuation-in-part application Ser. No. 406,897, there were claimed stable aqueous formaldehyde solutions containing, as stabilizers, guanamine, benzoguanamine or various derivatives thereof having the general formula:

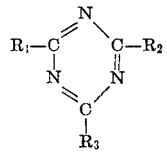

in which $R_1$ is a hydrogen atom or an alkyl, aryl, a partially hydrogenated aryl, a completely hydrogenated aryl, aryl ortho-substituted with a guanaminic radical, alkylaryl, substituted alkylamino groups, substituted aminoalkenyl group, unsubstituted alkylamino group or unsubstituted aminoalkenyl group; and $R_2$ and $R_3$ are the same or different hydroxyl, aryl groups, possibly hydrogenated or substituted in the benzene ring, or —NR'R" groups in which R' and R" are the same or different and can be hydrogen atoms or aryl or alkyl or alkylene groups possibly substituted with hydroxyl groups.

It has now surprisingly been found that a paraformaldehyde, free of pasty products and soluble in water, can be obtained with high yields if the starting formaldehyde solutions contain only small amounts of benzoguanamine or of other stabilizers comprised in the above mentioned general formula.

Examples of such stabilizers include: benzoguanamine (2,4-diamino-6-phenyl-s-triazine)

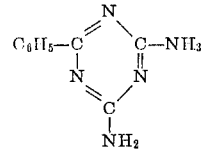

methylolbenzoguanamine (N,N'-dimethylol-2,4-diamino-6-phenyl-s-triazine)

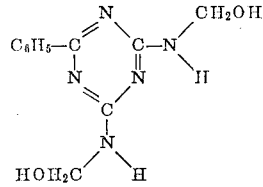

diallylmelamine (2,4-diamino-6-diallylamino-s-triazine)

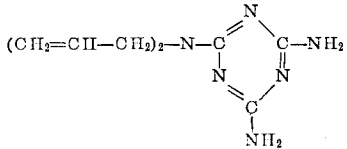

tetrahydrobenzoguanamine (2,4 - diamino - 6 - tetrahydrophenyl-s-triazine)

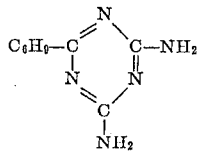

acetoguanamine (2,4-diamino-6-methyl-s-triazine)

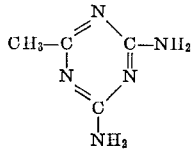

capryloguanamine (2,4-diamino-6-n-heptyl-s-triazine)

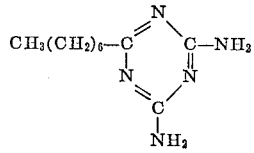

butyroguanamine (2,4-diamino-6-n-propyl-s-triazine)

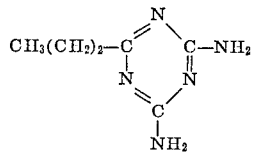

formoguanamine (2,4-diamino-s-triazine)

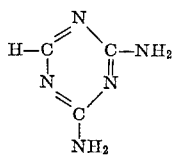

phenylacetoguanamine (2,4-diamino-6-benzyl-s-triazine)

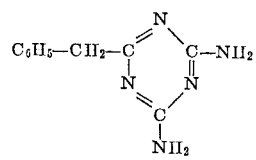

lauroguanamine (2,4-diamino-6-n-undecyl-s-triazine)

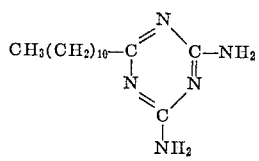

m-methyl - benzoguanamine (2,4 - diamino - 5 - m - methylphenyl-s-triazine)

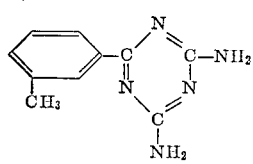

tetramethylolbenzoguanamine N,N' - tetramethylol - 2,4-diamino-6-phenyl-s-triazine

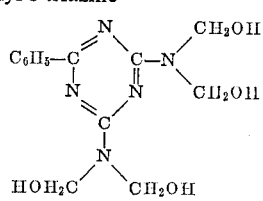

cyclohexylguanamine (2,4 - diamino - 6 - cyclohexyl - s-triazine)

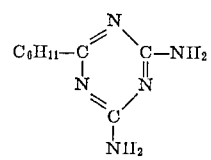

N - phenyl formoguanamine (N - phenyl - 2,4 - diamino-s-triazine)

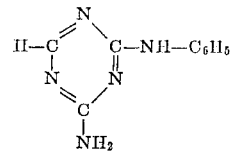

N - ethyl formoguanamine (N - ethyl - 2,4 - diamino - s-triazine)

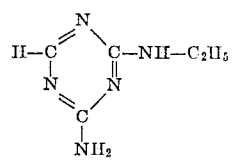

This paraformaldehyde can be obtained either in the form of crystalline powder which allows an easy centrifuging and drying (even by operating at temperatures lower than 25° C.), or in the form of flakes which are easily handled and easily transportable.

These two forms are identical from the chemical and the physico-chemical points of view.

The only difference lies in the macroscopic physical forms of the compounds because the flakes themselves are consistent crystalline aggregates.

Whenever "paraformaldehyde" or "product" is mentioned herein, and unless otherwise specified, both forms are meant.

The paraformaldehyde obtained from the formaldehyde solutions containing the aforementioned stabilizers presents particularly valuable characteristics such as a complete solubility in water immediately after its preparation (formaldehyde content higher than 80%) and also after prolonged storage at room temperature (at least for some months) or even after drying (formaldehyde content higher than 96%).

This characteristic has a relationship to the relatively low molecular weight (average degree of polymerization=15-70) of the polyoxymethylene sequences determined on the basis of the number of the terminal hydroxyl groups obtainable by using the stabilizing agents according to the invention. They act, presumably, as regulators of the molecular weight by decreasing the kinetics of the chain growth. By employing benzoguanamine, probably at least four polyoxymethylene chains grow on the benzoguanamine molecule. Analogous growths have been verified for the other claimed stabilizers containing amine groups.

According to the experimental evidence, a large part of the polyoxymethylene chains contain the chemically bonded benzoguanamine. This has been proved by the modification in infrared spectra and by the solubility data of the benzoguanamine and its methylol derivatives. It has further been proved by the fact that after purification and crystallization the concentration of benzoguanamine groups in the paraformaldehyde does not change.

By centrifuging the slurry wherefrom the paraformaldehyde in the crystalline powder form is obtained, a mother liquor is obtained which is a product having valuable properties. The mother liquor in fact is an aqueous solution with a formaldehyde content 36% by weight, which, after suitable dealkalinization can be recycled or directly used for various commercial applications. Moreover, we have also surprisingly found that this mother liquor appears to be stable even after storage at low temperatures (e.g. −10° C. for several days). This results from the action of the stabilizers utilized in the preparation of paraformaldehyde, which remain in minimum proportions (0.05 to 0.5%) in the mother liquor, thus making it very similar to the stabilized formaldehyde solutions containing the aforementioned stabilizers.

It should be noted that, in order to obtain a similar stability at low temperatures by using methanol, the conventional formaldehyde solution would have to have a methanol content of 7 to 14% (see e.g., the technical bulletin of Celanese, "Celanese Stabilized Formaldehyde").

The technology of preparation of the paraformaldehyd from aqueous formaldehyde solutions with the use of the aforementioned stabilizers can be summarized as follows:

Stabilization of the formaldehyde solutions to be used as a starting product (e.g. up to 65% by weight) by utilizing benzoguanamine or another similar stabilizer selected from those described above.

If necessary, concentration under reduced pressure of the above formaldehyde solutions up to a $CH_2O$ content higher than 45%. The same results are obtained by first carrying out the concentration and then the addition of the stabilizers.

Alkalinization of the concentrated formaldehyde solution by addition of a 30% NaOH solution up to a pH value between 8.0 and 10.0.

Slow and gradual cooling of the alkaline formaldehyde solution having a $CH_2O$ content >45%, and crystallization under agitation up to a temperature of between 10° and 40° C. (preferably at about 20° C.). The solution is kept in the crystallization stage for times varying from 30 minutes to 20 hours or even longer, depending on the temperature adopted.

Filtration in a centrifuge of the slurry obtained, so as to reduce to a minimum, preferably below 20%, the residual water in the crystals. Possibly a treatment of the slurry or of the centrifuged crystals with dilute solutions of weak organic acids for neturalizing the excess of NaOH may follow the filtration.

Treatment of the mother liquor separated in the centrifuge with a cation exchange resin in order to eliminate the NaOH excess.

The technology of preparation of paraformaldehyde in flake form from aqueous formaldehyde solutions with the use of the above mentioned stabilizers can be summarized as follows:

Stabilization of the formaldehyde solution to be used as the starting product (e.g. up to 65% by weight) by utilizing benzoguanamine or another stabilizer selected from those described above.

Concentration at reduced pressure preferably from 50–200 mm. Hg until a formaldehyde percentage of at least 80% by weight is obtained.

Alkalinization of the concentrated formaldehyde solution by the addition of a 30% NaOH solution until a pH value of between 8.0 and 10.0 is obtained.

Quenching of the solution on a cooled metal surface (cooled with water or other media) for a variable period of time, preferably 1–3 minutes. The cooling surface may be a rotating drum or a metal tape that runs at variable speeds or another apparatus that cools in the described manner.

Scraping of the cooled product and flaking with suitable knives.

By operating according to the above described technology, which can be accomplished by a continuous, semi-continuous or discontinuous process under the most advantageous conditions, there is always obtained:

(a) a paraformaldehyde in a finely dispersed crystalline powder or flake form, free of pasty products, which is easily and completely soluble in water at temperatures above 50° C. It has an exceptionally low number average molecular weight of the polyoxymethylene chains, calculated on the basis of the number of terminal hydroxyl groups, and a formaldehyde content higher than 75% and preferably higher than 80%.

The very good solubility characteristics are maintained for the two forms of the product, crystalline powder or flakes, even if subjected to drying up to a content of non-chemically bound water lower than 1–2% ($CH_2O$ content 96%).

Moreover the paraformaldehyde of this invention, either before or after drying, gives aqueous formaldehyde solutions which are stable after storage even at low temperatures (e.g. −10° C.). This is due to the presence of the aforementioned stabilizers in the crystal.

The paraformaldehyde of this invention can also be used for preparing alcoholic formaldehyde solutions which are used in applications wherein low water content is preferred (varnishes, dressing, etc.).

By utilizing methanol or butanol there are obtained solutions containing respectively:

| Formaldehyde, percent by weight | Methanol, percent by weight | Butanol, percent by weight | Water, percent by weight to— |
|---|---|---|---|
| 55 | 33 | | 100 |
| 40 | | 51 | 100 |

Paraformaldehyde is dissolved in the warm alcohol at an alkaline pH (9–10) and if necessary with addition of water in order to obtain the prefixed percent composition.

The alcoholic solutions thus obtained remain limpid and free of any precipitate for long periods of time when stored at temperatures of about 20° C.

Also obtained are mother liquors with a $CH_2O$ content of between 36 to 40%, which are economically advantageous either for recycle or for the normal industrial applications after dealkalinization by passage through ion-exchange resins and readjustment of the formaldehyde content.

These solutions, due to the particular preparation, namely the use of the aforementioned stabilizers, have an exceptionally high degree of stability at low temperature storage. It is a stability similar to that of the solutions claimed in the aforementioned patent applications.

The values ofthe characteristics of the paraformaldehyde of this invention were determined by measuring the following parameters:

(1) Formaldehyde content.—Formaldehyde content (determined by the sulphite method on dissolved crystal). The crystal, after centrifuging, always shows a formaldehyde content higher than 80%.

(2) Average degree of polymerization.—The average degree of polymerization (average number of monomeric units forming the polyoxymethylene chains) is evaluated either from the content of terminal hydroxyl groups determined by infrared spectrography or from the chemical formaldehyde titer. These determinations are carried out on the paraformaldehyde which has been dehydrated by washing with acetone. The determination of the terminal hydroxyl groups has already been described in U.S. patent application Ser. No. 175,745 filed on Feb. 26, 1962, now abandoned, and is based upon the determination of the infrared absorption at 2.92 microns due to the $CH_2OH$ group. The absorption is measured from a suspension of the crystal in paraffin oil.

The formaldehyde content of the washed crystal is determined by iodometric analysis according to the Romjn method adopted by Staudinger (H. Staudinger—Die Hochomolekularen Organischen Verbindungen, 1932, 1st ed., p. 264).

The calculation of average degree of polymerization from the formaldehyde content is conducted according to Staudinger (p. 227 of the cited book) by taking into consideration not only the presence of chemically combined water, but also the presence of combined benzoguanamine determined by means of ultraviolet spectrophotometry.

(3) Solubility in water.—The surprising water solubility of the product of this invention is demonstrated by the values reported in the table, in comparison with the values determined from commercial paraformaldehyde samples.

As comparison samples "Forestali paraformaldehyde" (indicated by "PF.F.," a dry product containing more than 93% of $CH_2O$, manufactured by Societá Chimica Forestali of Milan) and "Synthite paraformaldehyde" (indicated by "PF.S." containing about 80% of $CH_2O$, manufactured by Synthite Ltd., West Bromwich, England) were used.

The values relate to solutions obtained by the addition of 20 parts by weight of the product to 100 parts of deionized water at neutral pH, without buffers.

TABLE 1

| Sample | Average degree of polymerization of the polyoxymethylene chains | Percent dissolved fraction |||||
|---|---|---|---|---|---|---|
| | | 50° C. || 60° C. || 80° C. |
| | | 30' | 60' | 30' | 60' | 30' |
| n. 1 | 50 | 88 | 98 | 92 | 99 | 98 |
| n. 4 | 30 | 90 | 98 | 95 | 99 | 99 |
| n. 12 | 20 | 94 | 99 | 97 | 99 | 99 |
| n. 30 | 25-30 | 95 | 99 | 98 | 99 | 99 |
| PF.S | 160-180 | 38 | 57 | 56 | 90 | [1] 65 |
| PF.F | 40 | 6 | 10 | N.D. | N.D. | 33 |

[1] About.

The solubility of the samples is practically complete. A 20% solution of the product, as is, at a neutral pH and at 50° C. does not contain more than 0.5% by weight of insoluble residue in equilibrium with respect to the product.

Even after storage of the product for some months at room temperature the insoluble residue of the solutions under the same conditions is not higher than 1%. By operating at higher temperatures or pH values, the insoluble residue is completely eliminated.

FIGURE 1 reports the solubility of the various samples of paraformaldehyde, as is, in deionized water at 50° C., with a concentration of 15% by weight. The time in minutes is reported on the abscissae and the percentage of non-dissolved paraformaldehyde is reported on the ordinates in a logarithmic scale (at time zero the percentage of undissolved paraformaldehyde is 100%).

The samples of paraformaldehyde indicated with PF.F and PF.S are the commercial products already described with reference to Table 1 while those indicated with FP. 1 and PF. 12 are samples of paraformaldehyde obtained according to Examples 1 and 4, respectively, hereinbelow.

Figure 2:
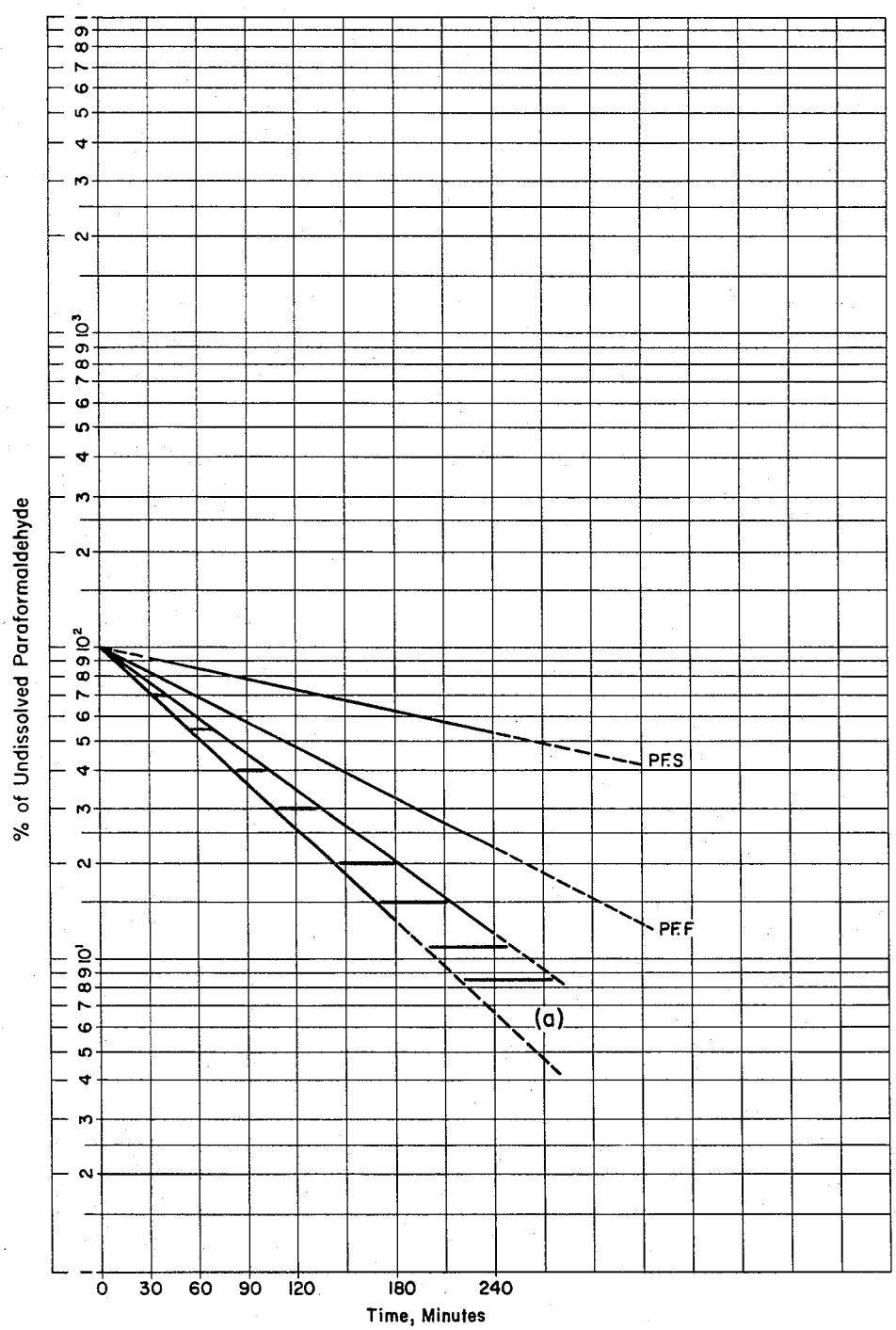

FIGURE 2 reports the solubility of the same samples of paraformaldehyde in a buffer at a pH of 5.75 at 50° C., with a concentration of 15% by weight. On the coordinates are reported the values already described in FIGURE 1. The dotted line (a) shows the zone of solubility of paraformaldehyde according to the present invention.

Since the solubilization of paraformaldehyde in water, in case of diluted solutions, is a reaction of hydrolysis of the semi-acetalic bond according to the following scheme:

$$HO-(CH_2-O)_n-CH_2OH + H_2O \rightarrow$$
$$\rightarrow CH_2(OH)_2 + HO-(CH_2O)_{n-1}-CH_2OH$$

it can be considered as a 1st order reaction although in the heterogeneous phase.

FIGURE 1 shows, in fact, that the solubility values, namely the fraction of hydrolyzed paraformaldehyde, are logarithmic functions of the contact time.

The constant of the 1st order reaction therefore will be a function of the mole number, the concentration being the same. That is, it will increase by decreasing the number average molecular weight (of the degree of polymerization) as is confirmed by the data of FIGURE 1 (Lobering, Ber. 69, 1844, 1936).

It is evident that the products obtained according to the technology described in the present application always fall in the area defined by:

$$(C=100\% \; t=0')(C=5\% \; t=60')$$

that is to say, they always have a surprising solubilization rate even without alkalinization.

The solubilization rate depends on the pH value of the solution. At pH of about 4.5 the acetalic bond has the highest stability against hydrolysis and it is therefore convenient to dissolve the product at least at the neutral pH.

The product of this invention shows higher solubility characteristics than the commercial products even at pH values at which the hydrolysis constant is very low (pH 5.75) as appears from FIGURE 2.

The paraformaldehyde of this invention does not contain, or contains minimum amounts of, low molecular weight polyoxymethylene glycol and differs therefore from the products obtained in the absence of stabilizers. The amount of these unstable low molecular weight polyoxymethylene glycols having a low melting point has been determined by extraction with acetone at 50–60° C. It is lower than 1–2% (Staudinger, cited work, page 248).

(4) Stabilizer content.—The products of this invention generally contain very low amounts of stabilizer (0.1 to 0.5%), which does not limit the characteristic use of the product as a source of formaldehyde. A concentration of between 0.01 and 5%, and preferably of between 0.05 and 0.5% by weight of stabilizer in the product is sufficient for the stabilization of the conventional formaldehyde solutions obtained from our paraformaldehyde even at low temperature.

(5) Thermal stability.—The paraformaldehyde of this invention, in spite of its very low number average molecular weight has a stability against thermal degradation at 100° C. similar to that of high molecular weight products. The products prepared according to the present invention, after dehydration by washing with acetone, have a depolymerization rate at 100° C. in an air current of about 1–1.5% per minute.

(6) Stability of aqueous formaldehyde solutions.—Table 2 shows the superior stability on storage, particularly at low temperatures, of aqueous formaldehyde solutions, obtained by dissolving the product of the present invention in water, as compared to the stability of solutions obtained from a commercial paraformaldehyde sample, namely from Synthite paraformaldehyde.

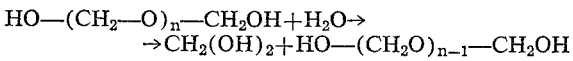

TABLE 2

| Sample | After 1 day at 10° C. | After 10 days at 10° C. |
|---|---|---|
| Aqueous solution (30%) of paraformaldehyde Synthite (PF.S), containing 80% $CH^2O$ | Precipitated | Precipitated. |
| Aqueous solution (30%) of paraformaldehyde obtained according to present invention, containing 80% $CH^2O$. | Limpid | Limpid. |

It can be seen that the solution obtained from Synthite paraformaldehyde precipitates after only one day storage at −10° C.

This occurs because polymerization proceeds at these temperatures so that polymers of such a molecular weight are formed that they can no longer remain in solution and therefore precipitate.

Solutions prepared from the product of the present invention remain limpid even after 10 days storage at −10° C.

This shows that these solutions are stable and that no substantial changes (such as polymerization) have occurred over such a period.

The following examples illustrate the invention without limiting its scope. In the examples the parts are by weight, unless otherwise stated.

Example 1

2000 g. of a 36% aqueous formaldehyde solution were charged into a 3-liter flask provided with an agitator, thermometer, and reflux condenser. The solution was kept under agitation and heated up to 50° C. 3.0 g. of benzoguanamine crystals were then added and the above operating conditions were maintained for about 16 hours. The solution was then concentrated under reduced pressure (50–100 mm. Hg), thus obtaining about 1200 g. of a stabilized aqueous formaldehyde solution, with a $CH_2O$ content of about 55%. At this point the pH was adjusted to about 9.0 by suitable addition of NaOH (30% solution). The solution was then cooled while slowly agitating so as to obtain a gradual temperature decrease from 55° to 20° C. within about 90 minutes, and the slurry thus obtained was kept at the temperature of 20° C. for a further 4 or 5 hours.

The crystallized paraformaldehyde was then separated, and 445 g. of a solid having a formaldehyde content of about 83% and 755 g. of a mother liquor having a formaldehyde content of about 38% were thus obtained. The paraformaldehyde obtained had a number average molecular weight of about 800 and a quick and complete water solubility (95% of the product dissolved in 30 minutes at pH—7.0 and 50° C.). The mother liquor was dealkalinized by passage through an ion exchange resin to give a 38% aqueous formaldehyde solution containing about 0.18% of stabilizer. This formaldehyde solution appeared to be stable upon storage at −10° C. for at least 12 days.

Example 2

2000 g. of a 36% aqueous formaldehyde solution were concentrated under reduced pressure (50–100 mm. Hg), thus obtaining about 1200 g. of a 55% formaldehyde solution. The solution was kept at 55° C. and to it were added 3.0 g. of benzoguanamine crystals. The thus treated solution was kept at 60° C. for 1 hour. After adjustment of the pH with NaOH, cooling and centrifuging, as described in Example 1, 400 g. of paraformaldehyde having a $CH_2OH$ content of about 83% and 800 g. of mother liquor with a $CH_2O$ content of about 38.4% were obtained.

The mother liquor was passed through an ion-exchange resin thus obtaining an aqueous formaldehyde solution having a $CH_2O$ content of about 38%, which solution was as stable at low temperatures as the solution of Example 1.

The paraformaldehyde obtained confirmed the values of molecular weight and the characteristics of water-solubility found in the crystalline product of the preceding example.

Example 3

2000 g. of a 36% aqueous formaldehyde solution were charged into the flask described in Example 1 and were heated to 50° C. while agitating. 3.0 g. of benzoguanamine crystals were added and the operating conditions of Example 1 were maintained for about 16 hours. The solution was then concentrated underreduced pressure (50–100 mm. Hg), thus obtaining about 1200 g. of a stabilized aqueous formaldehyde solution having a $CH_2O$ content of about 55%. The pH of the solution was adjusted to about 9.0 by suitable addition of NaOH (30% solution). The solution was then cooled, while agitating, to 20° C. and was kept at this temperature for 1 hour.

The crystallized paraformaldehyde was then separated by centrifuging. 309 g. of a solid having a $CH_2O$ content of about 86% and 861 g. of mother liquor having a $CH_2O$ content of about 41% were thus obtained. The paraformaldehyde thus obtained had a number average molecular weight of about 1100 and a water solubility similar to that of the crystals of Examples 1 and 2. The mother liquor was dealkalinized by passage through an ion-exchange resin and gave a 41% aqueous formaldehyde solution containing about 0.19% of stabilizer. This formaldehyde solution was stable to storage at −10° C. for about two weeks.

Example 4

2000 kg. of a 36% aqueous formaldehyde solution were charged into a 3 cubic meter autoclave provided with an anchor agitator, a temperature control and a reflux condenser. The solution was gradually heated to 50° C. and then, after the addition of 3 kg. of benzoguanamine crystals, was left to stand at this temperature for 12 hours. The solution was then concentrated under reduced pressure until a formaldehyde content of about 56% was reached. The pH was adjusted to 9.0 by the addition of a 30% NaOH solution and the solution was cooled as described in Example 1.

By centrifuging the slurry, there were obtained 565 kg. of paraformaldehyde with a $CH_2O$ content of 84.2% and 755 kg. of mother liquor with a $CH_2O$ content of 38.9%. The paraformaldehyde had characteristics similar to those of the laboratory products, with a number average molecular weight of about 1000 and a quick and complete solubility in water (95% dissolved in 30–40 minutes at 50° C.). The mother liquor, dealkalinized by passage through ion-exchange resins, gave a 38.8% aqueous formaldehyde solution having good stability characteristics even at low temperature.

Example 5

556 g. of water, alkalinized to a pH of 9.0 with NaOH (0.4 part per 100 parts of solution), were introduced into a 2-liter flask immersed in a thermostatic bath and provided with a thermometer, agitator and reflux condenser. The thermostatic bath was heated to 80° C., and 434 g. of paraformaldehyde (obtained according to Example 1 with a $CH_2O$ content of 83%) were introduced into the flask while agitating. After 10–15 minutes the paraformaldehyde was completely dissolved and the 36% aqueous formaldehyde solution thus obtained (pH=3.6–3.7) showed very good stability characteristics even at low temperatures. These good stability characteristics result from the presence, in the crystal, of the stabilizer (benzoguanamine) used in the preparation of the paraformaldehyde.

Example 6

500 g. of paraformaldehyde ($CH_2O$ content—81.5%) obtained as described in Example 1, were dried in an oven at 35° C. for about 8 hours under atmospheric pressure. Paraformaldehyde having a $CH_2O$ content of 97.7% was thus obtained while the formaldehyde loss due to drying was 6–7%. The lost formaldehyde, however, could be recovered by washing with water. The loss obviously can be remarkably reduced by operating under reduced pressure. 368 g. of this paraformaldehyde were introduced into the 2-liter flask described in Example 5, containing 632 g. of water alkalinized to a pH of about 9.0. After treatment at 80° C. for 10–15 minutes, the paraformaldehyde was completely dissolved and the 36% aqueous formaldehyde solution (pH=3.6–3.8) thus obtained had very good stability characteristics even at low temperatures due to the presence, in the crystal, of the stabilizer used in the preparation of the paraformaldehyde (benzoguanamine).

Example 7

2000 g. of a 36% aqueous formaldehyde solution were charged into a 3-liter flask provided with an agitator, thermometer and reflux condenser. The solution was kept under agitation and gradually heated to 50° C. 8.0 g. of diallylmelamine crystals were added and the operative conditions were maintained for about 16 hours. The solution was then concentrated under reduced pressure (50–100 mm. Hg), thus obtaining about 1200 g. of a stabilized 55% aqueous formaldehyde solution. At this point the pH was adjusted to about 9.0 by the addition of NaOH (30% solution). The solution was then cooled while slowly agitating, so as to have a gradual temperature decrease from 55° to 20° C. within about 90 minutes. The slurry obtained was kept at 20° C. for a further 4 hours and 30 minutes.

The crystallized paraformaldehyde was then separated by centrifuging and 370 g. of a solid having a $CH_2O$ content of 85% and 790 g. of mother liquor having a $CH_2O$ content of 36.6% were thus obtained. The paraformaldehyde thus obtained had a number average molecular weight of about 1100 and a water solubility similar to that of the product described in Example 1.

The mother liquor, after dealkalinization by passage through ion-exchange resins, gave a 36.6% aqueous formaldehyde solution which, due to the use of diallylmelamine in the preparation of the paraformaldehyde, was stable even at low temperatures.

Example 8

By operating as in Example 6, 2000 g. of a 36% aqueous formaldehyde solution were heated in a flask to 50° C. and, after the addition of 6.0 g. of tetrahydrobenzoguanamine crystals, kept at 50° C. for about 16 hours. After concentration under reduced pressure until a $CH_2O$ content of about 55% was reached, the pH was adjusted with NaOH and the solution was cooled and centrifuged as described in Example 7.

490 g. of paraformaldehyde having a $CH_2O$ content of about 80% and 686 g. of mother liquor having a $CH_2O$ content of about 36% were thus obtained. The paraformaldehyde thus obtained had a number average molecular weight of about 1150, and confirmed the characteristics of water solubility of the products described in the preceding examples.

The mother liquor, after dealkalinization by passage through ion-exchange resins, gave a 36% aqueous formaldehyde solution which, due to the presence of tetrahydrobenzoguanamine, was stable upon storage even at low temperatures.

Example 9

A 36% formaldehyde solution containing 0.12% of benzoguanamine was concentrated in a multiple stage evaporator until the concentration of the formaldehyde was 85% by weight. The concentration was carried out with a residual pressure of 100 mm. Hg. To the solution thus obtained, there was added 0.02% NaOH at 90° C. The solution was then cooled for 100–120 seconds on a metal surface which was kept cold with running water.

The product had a thickness of 1 mm. It crystallized quickly, became fragile and tended to detach itself from the cool surface. The product was then flaked with suitable knives. The flakes contained about 10% water. The paraformaldehyde flakes thus obtained are easily transported and used. They may be used as such, or may be dried by well known methods. They have an optimum solubility demonstrated by the fact that 93% of the product dissolved in water at 50° C. in 30 minutes and 100% of the product dissolved in 1 hour at 50° C.

Example 10

2,000 g. of a 36% aqueous formaldehyde solution were concentrated under reduced pressure (50 to 100 mm. Hg). 1,200 g. of 55% formaldehyde solution were thus obtained. 3.6 g. of acetoguanamine were added to this solution. The stabilized solution was kept at 60° C. for 1 hour. The pH of the solution was adjusted to 8.9 by adding a 30% aqueous sodium hydroxide solution. The solution was cooled to 20° C. during 90 minutes and kept at this temperature for 150 minutes while agitating. The crystallized paraformaldehyde was separated from the mother liquor by filtration. 680 g. of crystalline solid having a formaldehyde content of 78% was thus obtained. It completely dissolved in water at pH of 7 and at 50° C. in 30 minutes.

Example 11

2,000 g. of a 36% aqueous formaldehyde solution were concentrated under reduced pressure (50 to 100 mm. Hg). 1,200 g. of a 55% $CH_2$ solution were thus obtained. 3.0 g. of formoguanamine were added to this solution. The stabilized solution was kept at 60° C. for 1 hour. The pH of the solution was then adjusted to 8.9 by addition of 31% sodium hydroxide solution. The solution was cooled to 20° C. during 90 minutes and kept at this temperature for 150 minutes while agitating.

The crystallized paraformaldehyde was separated from the mother liquor by filtration. 670 g. of a crystalline solid having a formaldehyde content of 80% were obtained. The paraformaldehyde thus obtained was completely soluble in water at pH of 7 at 50° C. in 120 minutes.

Example 12

2,000 g. of a 36% aqueous formaldehyde solution were concentrated under reduced pressure (50 to 100 mm. Hg). 1,200 g. of a 55% formaldehyde solution were thus obtained. 3.6 g. of phenylacetoguanamine were added to this solution. The stabilized solution was kept at 60° C. for 1 hour. The pH of the solution was then adjusted to 8.9 by addition of a 30% aqueous sodium hydroxide solution.

During 90 minutes the solution was cooled to 20° C. and kept at this temperature for 150 minutes while agitating. The crystallized paraformaldehyde was separated from the mother liquor by filtration. 480 g. of crystalline product having a formaldehyde content of 81.5% were obtained. The paraformaldehyde thus obtained was completely soluble in water at pH of 7 at 50° C. in 120 minutes.

Example 13

2,000 g. of a 36% aqueous formaldehyde solution were charged into a 3-liter flask provided with an agitator, thermometer and reflux condenser. The solution was kept under agitation and gradually heated up to 50° C. 3 g. of m-methylbenzoguanamine crystals were then added and the above operating conditions were maintained for about 16 hours. The solution was then concentrated under reduced pressure (50–100 mm. Hg), thus obtaining about 1,200 g. of stabilized aqueous formaldehyde solution with a $CH_2O$ content of about 55%. At this point the pH was adjusted to about 9.0 by suitable addition of NaOH (30% solution). The solution was then cooled while slowly agitating, so as to obtain a gradual temperature decrease from 55° to 20° C. within about 90 minutes, and the slurry thus obtained was kept at the temperature of 20° C. for a further 4 or 5 hours. The crystallized paraformaldehyde was then separated, and 445 g. of a solid having a formaldehyde content of about 83% and 775 g. of a mother liquor having a formaldehyde content of about 38% were thus obtained.

The paraformaldehyde thus obtained had a number average molecular weight of about 800 and a quick and complete water solubility (95% of the product dissolved in 30 minutes at a pH of 7.0 and 30° C.).

The mother liquor was dealkalinized by passage through an ion exchange resin and gave a 38% aqueous formaldehyde solution containing about 0.18% of stabilizer. This formaldehyde solution appeared to be stable upon storage at −10° C. for at least 12 days.

Example 14

2000 g. of a 36% aqueous formaldehyde solution were charged into a 3-liter flask provided with an agitator, thermometer and reflux condenser.

The solution was kept under agitation and gradually heated up to 50° C. 5 g. of tetramethylolbenzoguanamine crystals were then added and the above operating conditions were maintained for about 16 hours. The solution was then concentrated under reduced pressure (50–100 mm. Hg), thus obtaining about 1,200 g .of a stabilized aqueous formaldehyde solution with a CH₂O content of about 55%.

At this point the pH was adjusted to about 9.0 by suitable addition of NaOH (30% solution). The solution was then cooled while slowly agitating so as to obtain a gradual temperature decrease from 55° to 20° C. within about 90 minutes, and the slurry thus obtained was kept at the temperature of 20° C. for a further 4 or 5 hours.

The crystallized paraformaldehyde was then separated, and 445 g. of a solid having a formaldehyde content of about 83% and 755 g. of a mother liquor having a formaldehyde content of about 38% were thus obtained. The paraformaldehyde obtained had a number average molecular weight of about 800 and a quick and complete water solubility (95% of the product dissolved in 30 minutes at a pH of 7.0 and 50° C.). The mother liquor was dealkalinized by passage through an ion exchange resin and gave a 38% aqueous formaldehyde solution containing about 0.18% of stabilizer.

This formaldehyde solution appeared to be stable upon storage at −10° C. for at least 12 days.

Example 15

By operating as described in Example 14, 2000 g. of a 36% aqueous formaldehyde solution were heated in a flask to 50°C., and after the addition of 6.0 g. of cyclohexylguanamine crystals, kept at 50° C. for about 16 hours. After concentration under reduced pressure until a CH₂O content of about 55% was reached, the pH was adjusted with NaOH and the solution was cooled and centrifuged as described in the preceding examples.

490 g. of paraformaldehyde having a CH₂O content of about 80% and 686 g. of mother liquor having a CH₂O content of about 36% were thus obtained.

The paraformaldehyde thus obtained had a number average molecular weight of about 1,150 and confirmed the characteristics of water solubility of the products described in the preceding examples.

The mother liquor, after dealkalinization by passage through ion exchange resins, gave a 36% aqueous formaldehyde solution which, due to the presence of cyclohexylguanamine, was stable upon storage even at low temperature.

Example 16

2000 g. of a 36% aqueous formaldehyde solution were concentrated under reduced pressure (50–100 mm. Hg), thus obtaining 1200 g. of an aqueous formaldehyde solution with a CH₂O content of 55%. 3.6 g. of N-phenylformoguanamine were then added to this solution. The stabilized solution was maintained for 1 hour at 60° C. At this point the pH was adjusted to about 8.9 by suitable addition of NaOH (30% solution). The solution was then cooled while slowly agitating so as to obtain a gradual temperature decrease to 20° C. within about 90 minutes, and it was then kept at this temperature for an additional 150 minutes.

The crystallized paraformaldehyde was then separated from the mother liquor by filtration.

680 g. of a crystalline solid having a formaldehyde content of about 78% were obtained. The paraformaldehyde obtained was completely soluble in water (100% of the product dissolved in 30 minutes at pH 7 at 50° C.).

Example 17

2000 g. of a 36% aqueous formaldehyde solution were concentrated under reduced pressure (50—100 mm. Hg), thus obtaining 1200 g. of an aqueous formaldehyde solution with a CH₂O content of 55%. 3.6 g. of N-ethylformoguanamine were then added to this solution. The stabilized solution was maintained for 1 hour at 60° C. At this point the pH was adjusted to about 8.9 by suitable addition of NaOH (30% solution). The solution was then cooled while slowly agitating so as to obtain a gradual temperature decrease to 20° C. within about 90 minutes, and it was then kept at this temperature for an additional 150 minutes.

The crystallized paraformaldehyde was then separated from the mother liquor by filtration.

680 g. of a crystalline solid having a formaldehyde content of about 78% were obtained.

The paraformaldehyde obtained was completely soluble in water (100% of the product dissolved in 30 minutes at pH 7 at 50° C.).

Variations can, of course, be made without departing from the spirit and scope of the invention.

Having thus described our invention, what we desire to secure by Letters Patent and hereby claim is:

1. A paraformaldehyde composition having a formaldehyde content higher than 75%, a dry microcrystalline appearance free of pasty and aldolic products, a water solubility at 50° C. of about 95% in 30–40 minutes, polyoxymethylene chains having an average polymerization degree of between 15 and 70, containing 0.01 to 5% by weight of said composition of a stabilizer having the formula

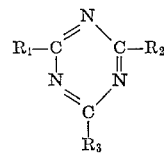

in which $R_1$ is selected from the group consisting of hydrogen, alkyl, aryl, a partially hydrogenated aryl, cycloalkyl, alkylaryl, and alkenylamino radicals and $R_2$ and $R_3$ are each —NR'R" radicals in which R' and R" are each selected from the group consisting of hydrogen, aryl, alkyl and hydroxyalkylene radicals.

2. The composition of claim 1 wherein the amount of stabilizer is from 0.05 to 0.5% by weight of the paraformaldehyde.

3. Solid crystalline paraformaldehyde having a formaldehyde content higher than 96%, easily soluble in water, and obtained by drying the composition of claim 1.

4. The composition of claim 1 wherein the stabilizer is selected from the group consisting of benzoguanamine, diallylmelamine, tetrahydrobenzoguanamine, acetoguanamine, formoguanamine, phenylacetoguanamine, m-methylbenzoguanamine, tetramethylolbenzoguanamine, cyclohexylguanamine, N-phenyl formoguanamine and N-ethyl formoguanamine.

References Cited

UNITED STATES PATENTS

| 2,551,365 | 5/1951 | Craven | 260—615.5 |
| 2,568,017 | 9/1951 | MacLean et al. | 260—615.5 |
| 2,694,076 | 11/1954 | Craven | 260—615.5 |
| 2,704,765 | 3/1955 | Smithson | 260—615.5 |
| 2,711,057 | 7/1955 | Chenicek | 252—401 |
| 2,936,298 | 5/1960 | Hudgin, et al. | 260—615.5 |
| 2,992,277 | 7/1961 | Porter | 260—615.5 |

FOREIGN PATENTS

| 1,253,275 | 1/1961 | France. |
| 1,367,082 | 6/1964 | France. |

OTHER REFERENCES

Derwent: Belgium Patent Reports, vol. 66A, 7–15–60, 260–606.

Pobloth et al.: Chem. Abst. 55 p. 7290, 1961, 260–615.5.

Walker: "Formaldehyde," 2nd edition, Reinhold Publishing Corp. N.Y. 1953, pp. 119–128 78 QD 305.A6 W3.

BERNARD HELFIN, *Primary Examiner.*

LEON ZITVER, *Examiner.*

H. MARS, *Assistant Examiner.*